United States Patent [19]

Sokolowski

[11] 4,107,919
[45] Aug. 22, 1978

[54] HEAT EXCHANGER

[75] Inventor: Daniel E. Sokolowski, Hinckley, Ohio

[73] Assignee: The United States of America as represented by the Administrator of the National Aeronautics and Space Administration, Washington, D.C.

[21] Appl. No.: 559,847

[22] Filed: Mar. 19, 1975

[51] Int. Cl.² ............................................. F02K 11/02
[52] U.S. Cl. ...................................... 165/169; 60/267; 239/127.1
[58] Field of Search .................... 165/169; 60/267; 239/127.1

[56] References Cited

U.S. PATENT DOCUMENTS

| 2,880,577 | 4/1959 | Halford | 165/169 |
|---|---|---|---|
| 2,926,490 | 3/1960 | Eaton | 165/169 |
| 2,935,841 | 5/1960 | Myers | 165/169 |
| 2,975,590 | 3/1961 | von der Esch | 165/169 |
| 3,013,641 | 12/1961 | Compton | 165/169 |
| 3,016,695 | 1/1962 | Lovingham | 165/169 |
| 3,043,103 | 7/1962 | Dent | 165/169 |
| 3,044,257 | 7/1962 | Shesta | 165/169 |
| 3,086,283 | 4/1963 | Webber | 165/169 |
| 3,218,799 | 11/1965 | Lovingham | 165/169 |
| 3,780,533 | 12/1973 | Huang | 165/169 |

Primary Examiner—Charles J. Myhre
Assistant Examiner—Margaret A. Latulip
Attorney, Agent, or Firm—Norman T. Musial; John R. Manning; James A. Mackin

[57] ABSTRACT

A heat exchanger, as exemplified by a rocket combustion chamber, is constructed by stacking thin metal rings having microsized openings therein at selective locations to form cooling passages defined by an inner wall, an outer wall and fins. Suitable manifolds are provided at each end of the rocket chamber. In addition to the cooling channel openings, coolant feed openings may be formed in each of rings. The coolant feed openings may be nested or positioned within generally U-shaped cooling channel openings. Compression on the stacked rings may be maintained by welds or the like or by bolts extending through the stacked rings.

21 Claims, 6 Drawing Figures

HEAT EXCHANGER

ORIGIN OF THE INVENTION

The invention described herein was made by an employee of the United States Government and may be manufactured or used by or for the Government without the payment of any royalties thereon or therefor.

BACKGROUND OF THE INVENTION

In the prior art one widely used method of constructing a rocket combustion chamber involves forming an inner wall, machining longitudinal channels into the wall and then forming an outer wall by techniques such as electroforming or the like. With this method, the minimum dimensions of the cooling channels is restructed due to machining limitations and other factors such as the type of material being used. Additional difficulties are presented if it is desired to have the cooling channels arranged in a spiral configuration around the rocket chamber.

Photoetching techniques have been used in the past to form in metal rings radial slots on the order of 0.005 to 0.125 inches in depth and extending radially inwardly between large cooling channels formed by stacking the metal rings and the interior of the chamber formed thereby. None of these slots align with ones in adjacent rings so that the interior of the rocket chamber is a porous like surface through which coolant is injected to provide transpirational cooling.

In rocket chambers of the prior art, fuel is often directed through the cooling passages in the wall of the rocket chamber. The fuel is usually delivered to a manifold around the rocket chamber by means of pipes or conduits connected between the manifold and a fuel tank in which the fuel is stored. Such pipes or conduits add weight to the engine, as well as causing problems of assembling and presenting dangers of external leakage.

OBJECTS AND SUMMARY OF THE INVENTION

It is an object of the invention to provide an improved heat exchanger specifically applicable as a rocket combustion chamber in which the heat-transfer efficiency and operational features surpass limitations of other prior art.

It is another object of the invention to provide a heat exchanger in which both cooling channels and coolant feed channels are disposed in the walls of the rocket chamber.

It is a further object of the invention to provide a heat exchanger in which spirally configurated cooling channels may be easily formed.

Still another object of the invention is to provide a method by which a rocket chamber having a highly efficient array of spiral cooling channels may be easily constructed.

Yet another object of the invention is to provide a heat exchanger which may be made of materials having a lower value of thermal conductivity than normally required.

An additional object of the invention is to provide a heat exchanger wherein the profile shapes of heat-transfer fins are unlimited and, therefore, provide fin profiles having regions of less stress concentration.

It is another object of the invention to provide a heat exchanger having longer operational life when subjected to cyclic modes of operation due to the inherent fatigue crack arrest feature of stacked plates.

An important object of the invention is to provide a heat exchanger having heat-transfer fins and cooling passages of sizes smaller than heretofore possible whereby a greater number of fins and cooling passages may be provided than in the prior art.

In summary, a rocket chamber embodying the invention incorporates microsize cooling channels in rings which are stacked to form either straight or spiral cooling channels. The rocket chamber may also include coolant feed channels formed in the stacked rings. A method of easily constructing a rocket chamber having spirally configurated cooling channels is part of the invention.

DESCRIPTION OF A PREFERRED EMBODIMENT

Figure 1:
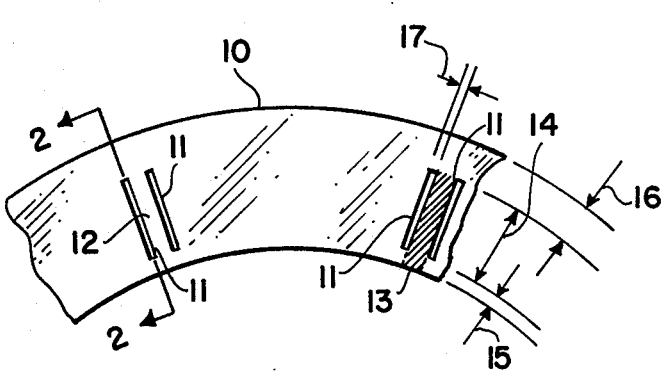
FIG. 1 is a pictorial plan view of a portion of a thin metal ring configuration suitable for constructing a heat exchanger.

Referring now to FIG. 1, there is shown a portion 10 of a thin metal ring containing a plurality of cooling channel openings 11. The area between any pair of cooling channels serves as a heat-transfer fin 12. For purposes of heat-transfer analysis, each of the fins 12 is considered to include a cross-sectional area as the shaded area 13. However, for purposes of explanation the radial thickness of each fin 12 will be considered to be that defined by the dimensional arrows 14 which also define the radial thickness apertures 11. Also, for purposes of explanation an inner wall is defined by the arrows 15 while an outer wall is defined by the arrows 16.

The apertures 11 are formed in the thin metal rings 10 by photoetching techniques which are well known in the art. By these techniques, the cooling passages 11 may be made extremely small so that a great number of them may be distributed around the ring 10 to increase heat-transfer effectiveness over prior art. The radial thickness of the cooling passages 11, as defined by arrows 14, is limited only by the radial thickness 15 of the inner wall 15 and the radial thickness of the outer wall, as defined by arrows 16. The circumferential width of the cooling passages 11 may be made as small as and as large as desired. However, in keeping with the invention, it is desirable to make the circumferential width 17 of the cooling passages 11 very small, preferably from about 0.002 inch to 0.040 inch.

Figure 2:
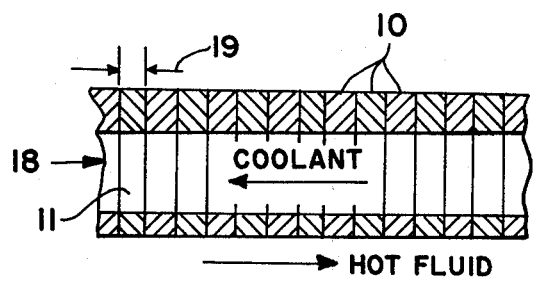
FIG. 2 is a longitudinal section of a stack of thin metal rings taken along the line 2—2 of FIGS. 1 and 3.

Referring now to FIG. 2, there is shown a longitudinal section of a stack of plates 10 showing the passageway 18 formed by the cooling channel openings 11. The thickness of each of the plates 10 is defined by the arrows 19 and is on the order from about 0.005 to 0.125 inches.

Figure 3:
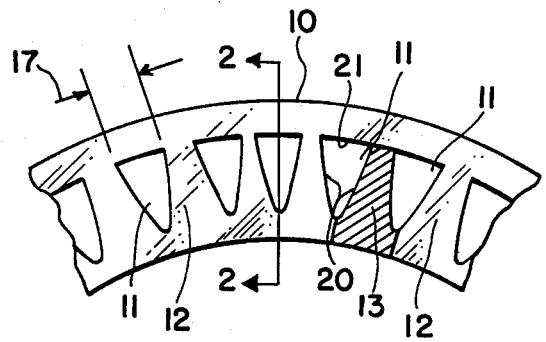
FIG. 3 is a pictorial plan view of a portion of a thin metal ring configuration showing a variation in the shape geometry of cooling channels.

FIG. 3 is another pictorial plan view of a portion of a thin metal ring and parts corresponding to those of FIG. 1 are identified by like numerals. The heat-transfer fins 12 shown in FIG. 3 are of inverse parabolic configuration. Thus, passageways 11 have generally parabolic-shaped sides 20 which serve as the hot walls of the cooling passage openings 11. Each of the cooling passageway openings 11 also has a cold wall 21 which is the inner surface of the outer wall. As in FIG. 1, the shaded area 13 is considered to be the cross-sectional area of each of fins 12 for analytic purposes.

The circumferential width of the passageway openings 11 is again defined by the arrows 17. The circumferential width of the passageway openings 11 at the cold wall may be on the order of 0.040 inches or less and may decrease to substantially zero at the outer surface of the inner wall, as shown.

Figure 4:
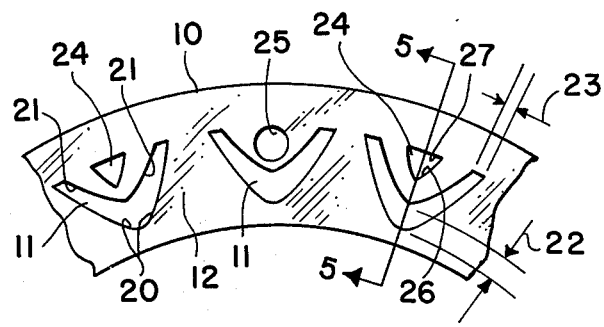
FIG. 4 is a pictorial plan view of a portion of a thin metal ring configuration showing both cooling channel openings and coolant feed channel openings.

FIG. 4 is a pictorial plan view of a portion of a thin metal ring having openings therein whereby a stack of such plates provides both cooling channels and coolant feed channels for the coolant in a heat exchanger, especially in a rocket combustion chamber wall. Parts corresponding to those of FIGS. 1 and 2 are identified by like numerals. The fins 12 of FIG. 4, like those of FIG. 3, are of inverse parabolic configuration. However, the cold wall 21, as shown, extends radially inwardly from the outer wall to provide a pair of generally parabolic shaped surfaces.

The distance between the outer surface of the inner wall and the tip of the cold wall 21, as defined by the arrows 22, is preferably much greater than that between the outer end of each hot wall 20 and the outer end of the cold wall 21, as defined by arrows 23. However, it will be understood that these dimensions may be altered and the shape of each of the fins 12 and the cooling passage openings 11 may be altered as desired. The configurations of fins and cooling passages shown in FIG. 4 are those which should provide maximum heat transfer but which may not meet certain other requirements as to positioning, size or structural limitations of a rocket combustion chamber wall.

To the end that coolant fluid may be directed to the cooling passage (18) formed by a stack of plates 10, as shown in FIG. 2, without requiring external conduits from coolant supplies to points on the outside of a rocket chamber, coolant feed channel openings 24 may be formed as the ring 10. As shown, these feed channels are positioned or nested within the generally U-shaped cooling channels 11. This arrangement permits a reduction in the distance between the inner surface of the inner wall and the outer surface of the outer wall. However, it will be understood that the coolant feed channel 24 may be moved radially outwardly toward the outer periphery of ring 10.

Also shown in FIG. 4 is an aperture 25, also nested or showing within one of the passageways 11. When a group of plates 10 are stacked, the apertures 25 provide a bolt passage so that a stack of assembled plates may be held together under tension by suitable bolts. Manifolds for the coolant can be provided at each end of the stack by arrangements and methods well known in the art. As with the feed passages 24, the apertures 25 may be positioned closer to the outer periphery of ring 10.

When a number of apertures 25 are positioned, as shown in FIG. 4, it will be understood that the size of the coolant feed channel openings 24 must be appropriately increased in size, i.e., cross-sectional area, so that the coolant feed channels formed by the openings 24 when a group of plates 10 are stacked will have approximately the same total cross-sectional area as that of the cooling channels formed by the cooling channel openings 11.

As shown in FIG. 4, the coolant feed channel openings 24 have generally parabolic shaped sides 26 and an upper edge 27 which follows the curvature of the ring 10. Thus, the coolant feed channel openings are of the same general shape as the walls defining them. The coolant feed channel openings 24 may be of other shapes as desired but the configuration shown in FIG. 4 is well suited for the cross-sectional shape of a coolant feed channel opening.

Figure 5:
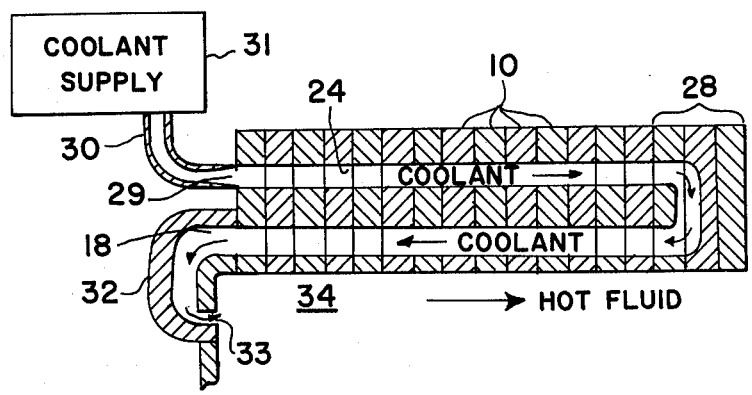
FIG. 5 is a longitudinal section of a stack of thin metal rings taken along the line 5—5 of FIG. 4.

Referring to FIG. 5 there is shown in longitudinal section taken along the line 5—5 of FIG. 4 a stack of plates 10 forming the wall of a rocket combustion chamber and having a manifold 28 at the downstream or open end of the rocket chamber. A coolant feed channel 29 is formed by the coolant feed channel openings 24 in the plates 10 and receives coolant through a conduit 30 from a coolant supply 31. The coolant flows through the feed channel 29 to the manifold 28 where it is redirected through the cooling channel 18 to a manifold 32. If the coolant fluid being obtained from the coolant supply 31 is a fuel which, in most rocket engines, is used for cooling purposes as well as for combustion, the fluid is directed through an injector opening 33 into the rocket chamber 34. As is well known to those in the art, if the coolant is fuel, oxidizer will be supplied through other injector elements into the combustion chamber 34. On the other hand, oxidizer may be supplied from the coolant supply 31 and will react with fuel injected through other injector elements into the combustion chamber 34.

With regard to FIG. 5, if a rocket combustion chamber is to use both liquid fuel and oxidizer, and these are to be used for cooling, one can be directed through the cooling channel 18 and the other through what is referred to as the coolant feed channel 29. With this arrangement manifold 28 would be eliminated and the channels 18 and 29 would be connected to the appropriate supply of liquid fuel and liquid oxidizer.

Another alternative is to use the configuration shown in FIG. 5 for either the liquid fuel or the oxidizer, while the remaining one is directed through channels having a similar cross section.

Figure 6:
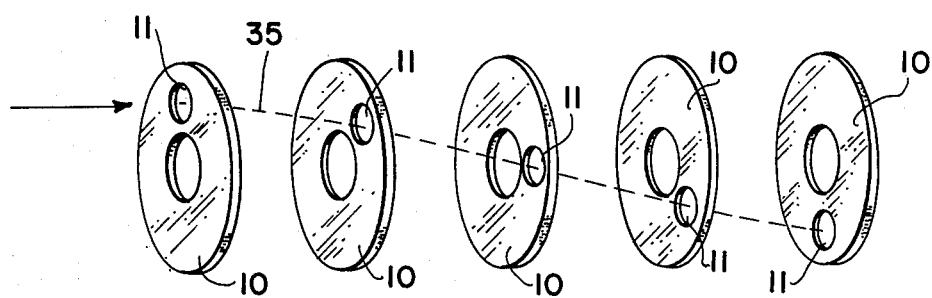
FIG. 6 is a pictorial exploded view of a plurality of rings such as that of FIG. 1 with each successive plate rotated slightly.

Referring now to FIG. 6, there is shown a plurality of rings 10 which may be stacked to form a heat exchanger such as a rocket chamber. For purposes of clarity, only one cooling channel opening 11 is shown in each of the rings 10. As illustrated by the dashed line 35, each of the rings 10 of a stacked assembly of rings may be successively rotated slightly about an axis perpendicular to the plane of the ring so that in a complete stack of plates the cooling passage formed by the cooling channel openings 11 will be of a spiral configuration. Accordingly, it will be seen that with a plurality of openings 11 there will be formed a plurality of spiral configurated channels 18. With this arrangement, the residence time, that is the time for the cooling fluid to go from one end of a cooling passage 18 to the other end, is advantageously increased.

As explained previously, the configurations of the cooling channel openings and the cooling feed channel openings may be of many different configurations. Furthermore, the cooling channel feed openings 24 and the apertures 25, as identified in FIG. 4, may be moved from those positions shown. For example, apertures 25 may be moved toward the periphery of ring 10 so that a cooling feed channel opening may be placed in the former position of aperture 25. Furthermore, and especially for the configuration in FIG. 6, tension bolts may be replaced by individual bonding between each successive plate.

It will be understood that changes and modifications may be made to the foregoing described invention by those skilled in the art without departing from the spirit and scope of the invention, as set forth in the claims appended hereto.

What is claimed is:

1. A heat exchanger comprising:
    a plurality of rings of high heat conductivity material stacked and maintained under compression, each ring having an inner wall, an outer wall and heat-transfer fins extending radially between the inner and outer walls, said walls and fins being established by a plurality of cooling channel openings which are less than 0.04 inches in circumferential width;
    a coolant supply; and
    means for connecting first ends of a plurality of cooling channels formed by said cooling channel openings to said coolant supply, said fins being substantially wider at said inner wall than at said outer wall, each ring being rotated slightly with respect to the preceding one to establish a plurality of spiral cooling channels.

2. The heat exchanger of claim 1 wherein said fins are spaced to be directly next to one another at the inner wall of the heat exchanger.

3. The heat exchanger of claim 1 wherein said fins are of generally inverse parabolic shape.

4. The heat exchanger of claim 3 wherein said fins are spaced directly next to one another at the inner wall of the heat exchanger.

5. The heat exchanger of claim 1 wherein each of said rings includes a plurality of apertures with respective bolts extending therethrough to compress said stacked rings.

6. The heat exchanger of claim 1 wherein each of said rings including a plurality of coolant feed openings to establish a plurality of coolant feed channels in said stacked rings,
    said means for connecting said first ends of said cooling channels to said coolant supply including said coolant feed passages and a manifold communicating with said coolant feed channels and said cooling channels.

7. The heat exchanger of claim 6 wherein said fins are substantially wider at said inner wall than at said outer wall, said outer wall having an inner surface which extends radially inwardly into each cooling passage opening, said coolant feed openings being positioned between said radially inwardly extending inner surface and the original location of the inner surface of the outer wall.

8. The heat exchanger of claim 7 wherein the coolant feed openings are of the same general configuration as the walls defining them.

9. The heat exchanger of claim 7 wherein said fins are of generally inverse parabolic shape and said radially inwardly extending inner surfaces are of generally parabolic shape.

10. The heat exchanger of claim 9 wherein the coolant feed openings are of the same general shape as the walls defining them.

11. A rocket combustion chamber having a closed injector end and an open exhaust end with injector element openings in said closed end and comprising of:
    a plurality of thin metal rings stacked and maintained under tension, each ring comprising an inner wall, an outer wall, and fins extending radially between the inner and outer walls, said walls and fins being established by a plurality of cooling channel openings which are no greater than 0.040 inches in circumferential width; each ring being rotated slightly with respect to the preceding one to establish a plurality of spiral cooling channels;
    a first manifold at said open end of the chamber in communication with said plurality of cooling channel openings;
    a second manifold at said closed end of the chamber in communication with said plurality of cooling channel openings;
    a coolant supply; means for connecting said first manifold to said coolant supply; and means for connecting said second manifold to said injector openings.

12. The rocket chamber of claim 11 wherein said fins are substantially wider at said inner wall than at said outer wall.

13. The rocket chamber of claim 12 wherein said fins are spaced directly next to one another at the inner wall of the rocket chamber.

14. The rocket chamber of claim 12 wherein said fins are of generally inverse parabolic shape.

15. The rocket chamber of claim 12 wherein said fins are spaced directly next to one another at the inner wall of the rocket chamber.

16. The rocket chamber of claim 11, each of said rings having a plurality of apertures with bolts extending therethrough to compress said stacked rings.

17. The rocket chamber of claim 11 wherein said means for connecting said first manifold to a coolant supply is comprised of a plurality of coolant feed openings formed in each of said metal rings to establish a plurality of coolant feed channels in said stacked rings and a third manifold at said closed end of the rocket chamber, said coolant feed passages communicating with said first and third manifolds; said third manifold being connected to said coolant supply.

18. The rocket chamber of claim 17 wherein said fins are substantially wider at said inner wall than at said outer wall, said outer wall having an inner surface which extends radially inwardly into each cooling passage opening, said coolant feed openings being positioned between said radially inwardly extending inner surface and the original location of the inner surface of said outer wall.

19. The rocket chamber of claim 18 wherein the cooling feed openings are of the same general configuration as the walls defining them.

20. The rocket chamber of claim 18 wherein said fins are of generally inverse parabolic shape and said radially inwardly extending inner surfaces are of generally parabolic shape.

21. The rocket chamber of claim 20 wherein the coolant feed openings are of the same general shape as the walls defining them.

* * * * *